United States Patent [19]

Benson

[11] 4,396,172

[45] Aug. 2, 1983

[54] AIRCRAFT CONSOLE

[76] Inventor: David L. Benson, 7474 Carmel La., Grand Ledge, Mich. 48837

[21] Appl. No.: 275,341

[22] Filed: Jun. 19, 1981

[51] Int. Cl.³ .............................................. B64C 7/00
[52] U.S. Cl. .................................. 244/129.1; D3/40; D12/155; 220/4 B; 224/42.42
[58] Field of Search ........................... 244/1 R, 129.1; 220/4 R, 4 B, 4 E, 4 F; 206/557, 561; 296/37.8, 37.14; 224/42.42 R, 273; D3/40, 74; D12/155; 312/235 A, 265; 52/802, 805

[56] References Cited

U.S. PATENT DOCUMENTS

| D. 207,916 | 6/1967 | White | D3/40 |
|---|---|---|---|
| D. 237,166 | 10/1975 | Jensen | D3/40 |
| D. 252,540 | 8/1979 | Murphy | D12/155 |
| D. 264,525 | 5/1982 | Page | D12/155 |
| 3,136,461 | 6/1964 | Gregg | 224/42.42 |
| 3,177,033 | 4/1965 | Daniels | 296/37 |
| 3,195,272 | 7/1965 | Mosher et al. | 220/4 B |
| 3,236,404 | 2/1966 | Boscamp | 220/4 R |
| 3,561,589 | 2/1971 | Larkin et al. | 206/19.5 |
| 3,670,936 | 6/1972 | Pronovost et al. | 224/42.42 |
| 4,154,355 | 5/1979 | Shackelford | 220/4 B |
| 4,300,709 | 11/1981 | Page | 224/42.42 |

*Primary Examiner*—Charles E. Frankfort
*Attorney, Agent, or Firm*—Miller, Morriss & Pappas

[57] ABSTRACT

An aircraft console provided with a pair of opposed shell housing members which matingly engage to provide an aircraft console outside wall housing. Each of the shell housing members provided with outwardly extending floor-engaging flange portions along the lower perimeter thereof. The floor-engaging flange portions cooperate to form a floor-engaging stabilizing support flange along the bottom perimeter of the assembled aircraft console. A plurality of internal partition panels and compartment floor panels provided which are selectively oriented to form a plurality of compartments within the aircraft console when fixedly positioned intermediate and in fixed engagement with the shell housing members. Transversely oriented connector floor-engaging anchor panels provided transversely across the bottom of the aircraft console so as to matingly engage the stabilizing support flange. A floor-engaging anchor assembly is provided to selectively engage the aircraft cabin floor, the floor-engaging anchor panels and the floor-engaging stabilizing support flange so as to anchor the aircraft console in its operative use position on the floor of the aircraft cabin.

5 Claims, 11 Drawing Figures

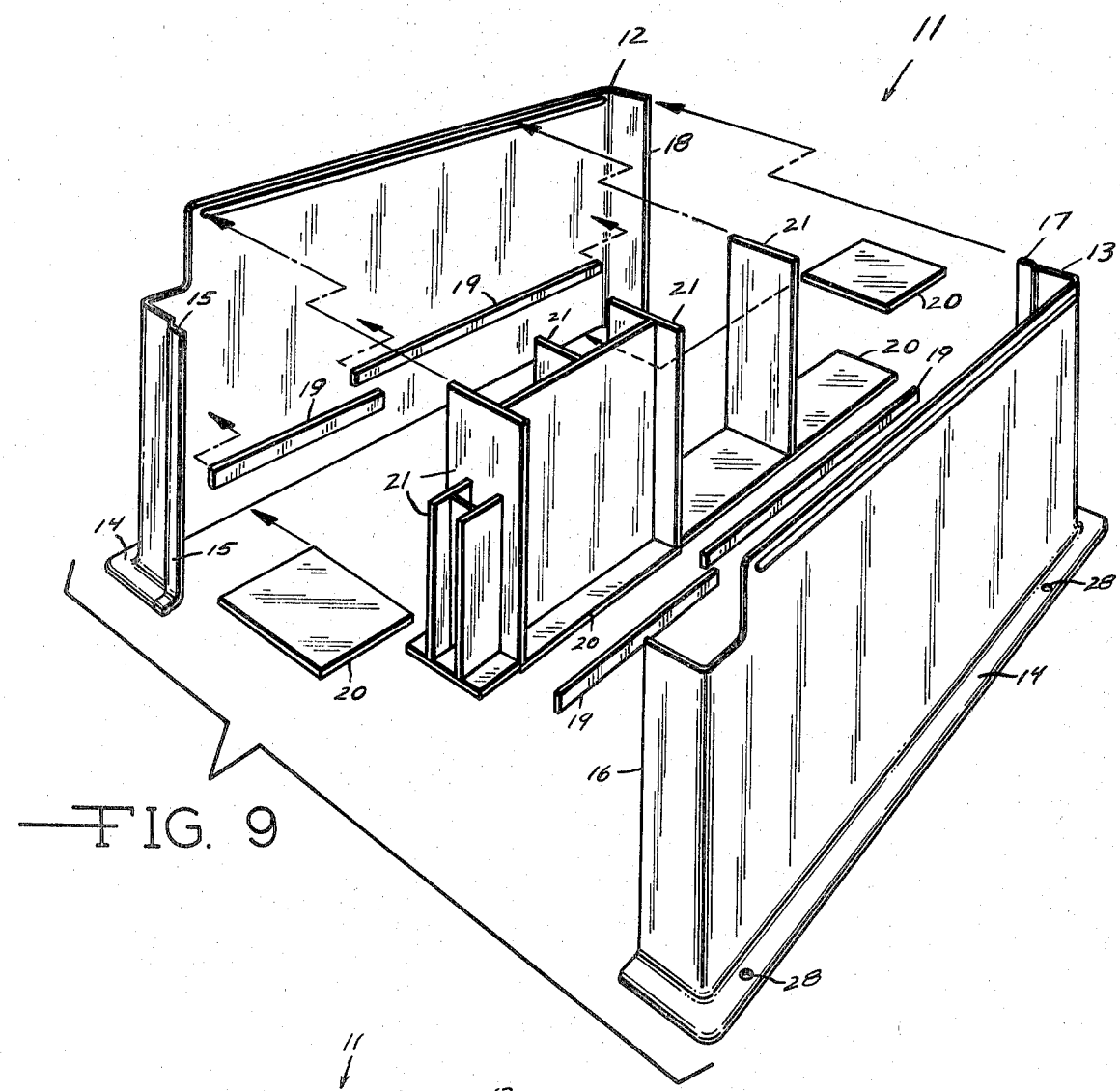
FIG. 9
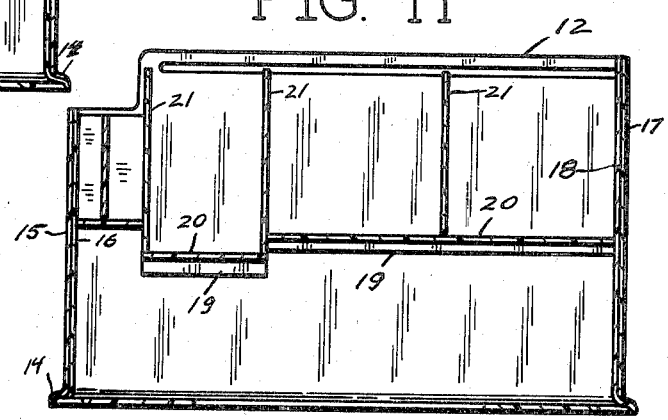
FIG. 10
FIG. 11

AIRCRAFT CONSOLE

This invention relates to a light weight aircraft console assembly which is selectively adapted for use in various aircraft cabin compartments. More specifically, this invention relates to an aircraft console assembly which is easily fabricated and assembled and which is easily installed on the floor of an aircraft cabin compartment in accordance with government regulations governing such installations.

The aircraft console assembly comprises a pair of plastic shell housing members which matingly engage to form the outer wall housing of the aircraft console assembly. Each of the plastic shell housing members are provided with outwardly extending floor-engaging flange portions along the lower perimeter thereof as to form a floor engaging stabilizing support flange along the bottom perimeter of the assembled aircraft console.

A plurality of internal partition panels and compartment floor panels are provided which are selectively oriented to form a plurality of compartments when fixedly positioned intermediate and in engagement with the shell housing members.

At least a pair of transversely oriented spaced apart connector and floor-engaging anchor panels are provided transversely across the bottom of the aircraft console so as to matingly engage the stabilizing support flange while in simultaneous surface contact with the floor of the aircraft cabin upon which the aircraft console is mounted. A floor-engaging anchor assembly is provided which is adapted to selectively engage the aircraft cabin floor, the floor-engaging anchor panels and the floor-engaging stabilizing support flange so as to anchor the aircraft console in its operative use position on the floor of the aircraft cabin.

It is thus seen that a light weight aircraft console assembly is provided which is easily fabricated and assembled into a structurally sound and stable aircraft console structure.

Further, an aircraft console assembly is provided which is easily anchored to the floor of an aircraft cabin and which is inherently stable in its operative use environment due to the outwardly extending floor-engaging stabilizing support flange portion along the lower perimeter thereof.

Nowhere in the known prior art is there shown such a light weight aircraft console assembly comprising a pair of shell housing members which matingly engage to form the outer wall housing of the aircraft console assembly. Further, nowhere in the prior known art is there shown an aircraft console assembly having an outwardly extending floor-engaging stabilizing support flange along the bottom perimeter thereof. Still further, nowhere in the prior art is there shown a plurality of partition panels and compartment floor panels which cooperate with the shell housing members to form a plurality of compartments therein while imparting structural strength to the entire unit. Still further, nowhere in the prior art is there shown an aircraft console assembly wherein a unique floor engaging and anchoring assembly is provided to mount the aircraft console assembly in an inherently stable operative use position on the floor of an aircraft cabin.

It is therefore an object of this invention to provide a light weight aircraft console assembly which is comprised of plastic components so that it can be easily fabricated and assembled into a structurally sound and inherently stable aircraft console assembly that meets and complies with government regulations pertaining to such installations.

Another object of this invention is to provide a light weight aircraft console assembly which can be easily and effectively anchored to the floor of an aircraft cabin in compliance with government regulations pertaining to such installations.

Other objects and advantages found in the construction of the invention will be apparent from a consideration of the following specification in connection with the appended claims and the accompanying drawings.

IN THE DRAWINGS

FIG. 9 is a schematic exploded perspective view showing the various components of the aircraft console assembly.

FIG. 10 is a cross-sectional view taken on line 10—10 of FIG. 1.

FIG. 11 is a cross-sectional view taken on line 11—11 of FIG. 2.

SPECIFIC DESCRIPTION

Figure 1:
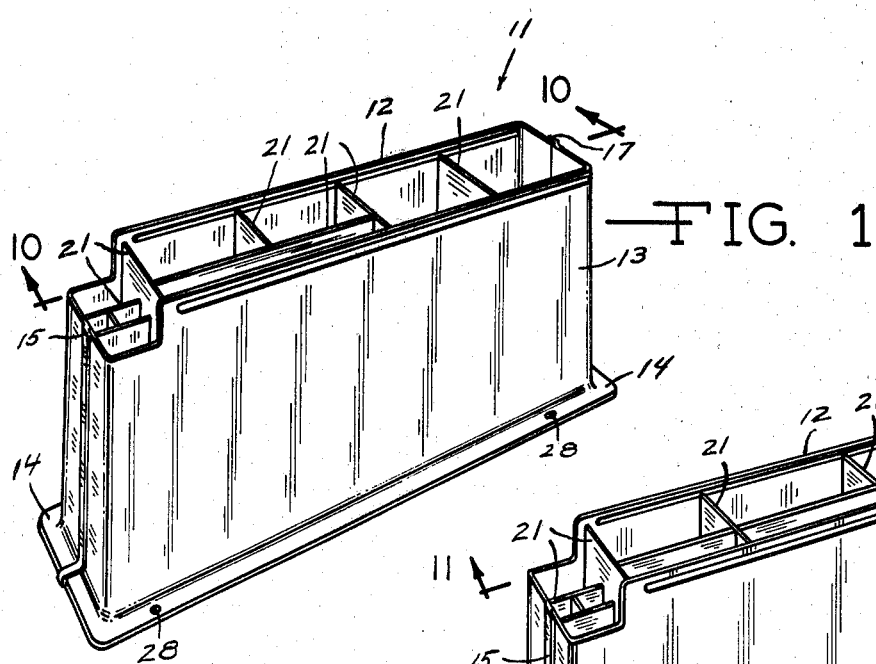
FIG. 1 is a right perspective view of the aircraft console assembly showing the lower floor-engaging stabilizing support flange and the various storage compartments provided therein.
Figure 2:
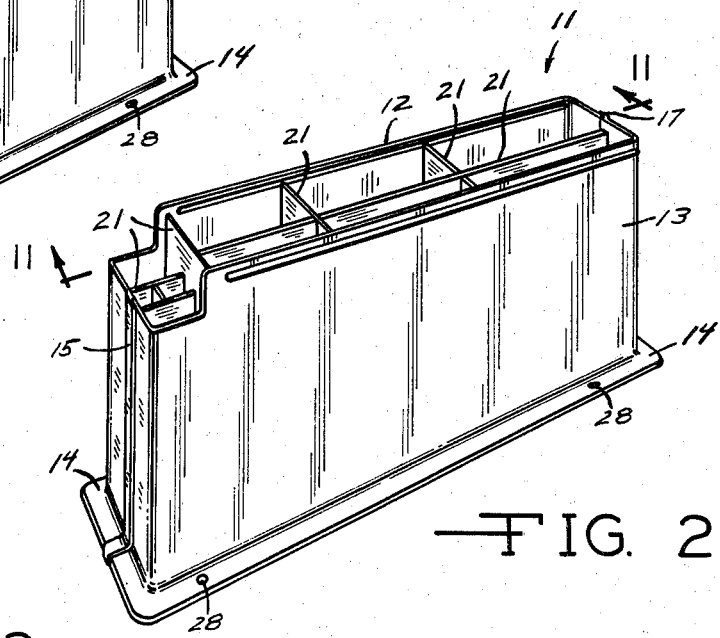
FIG. 2 is a right perspective view of the aircraft console assembly showing a modified compartment configuration provided therein.
Figure 3:
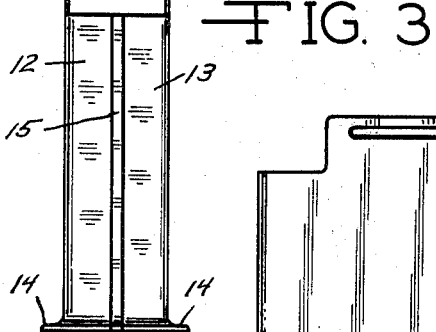
FIG. 3 is a front elevational view thereof.
Figure 4:
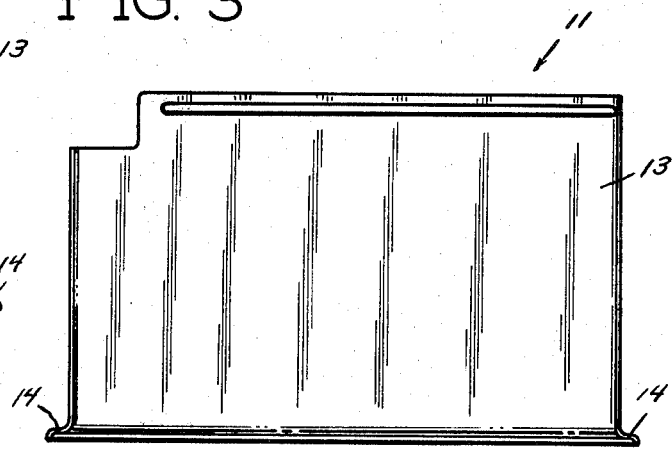
FIG. 4 is a side elevational view thereof.
Figure 5:
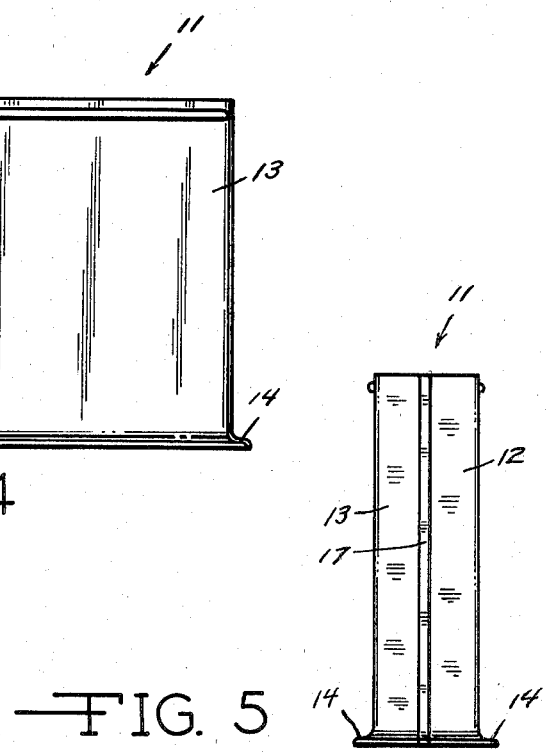
FIG. 5 is a rear elevational view thereof.

As shown in the drawings, the aircraft console assembly 11 consists of plastic shell housing members 12 and 13, respectively, which matingly engage to form the outer housing of the aircraft console assembly 11. Each of the plastic shell housing members 12 and 13, respectively, have an elongate U-shaped vertically oriented configuration with an outwardly extending floor-engaging stabilizing support flange 14 along the bottom perimeter thereof.

As shown generally in the drawings and specifically in FIG. 9, the plastic shell housing member 12 is provided with a vertically oriented overlap lip flange extension 15 along the forward vertical edge thereof which is adapted to matingly overlap the forward vertical edge portion 16 of the plastic shell housing member 13. The plastic shell housing member 13 is provided with a vertically oriented overlap lip flange extension 17 along the rear vertical edge thereof which is adapted to matingly overlap the rear vertical edge portion 18 of the plastic shell housing member 12. The plastic shell housing members 12 and 13 are fixedly held in their matingly joined position by use of a suitable resin glue applied along overlapping edges thereof. It is considered to be within the scope of the invention that other means or configurations can be utilized to interconnect the plastic shell housing members 12 and 13.

As again shown specifically in the FIG. 9, the various compartments in the aircraft console are selectively formed by use of compartment floor support strips 19 which are selectively glued to the inner wall surfaces of the plastic shell housing members 12 and 13. Compartment floor panels 20 are selectively provided which are glued to the upper portions of the support strips 19. Divider or partition panels 21 are selectively provided to form the various compartment configurations as dictated by the needs of the user. The edges of the divider or partition panels 21 are selectively glued to selected of the panels and/or to the inner surfaces of the shell housing member 12 and 13 to complete the formation of the individual compartments. The layout or configuration of the compartments can be varied as shown in FIGS. 1, 2, 10 and 11. Any other desired compartment configuration can be achieved by varying the size of the partition and floor panels as desired.

Figure 6:
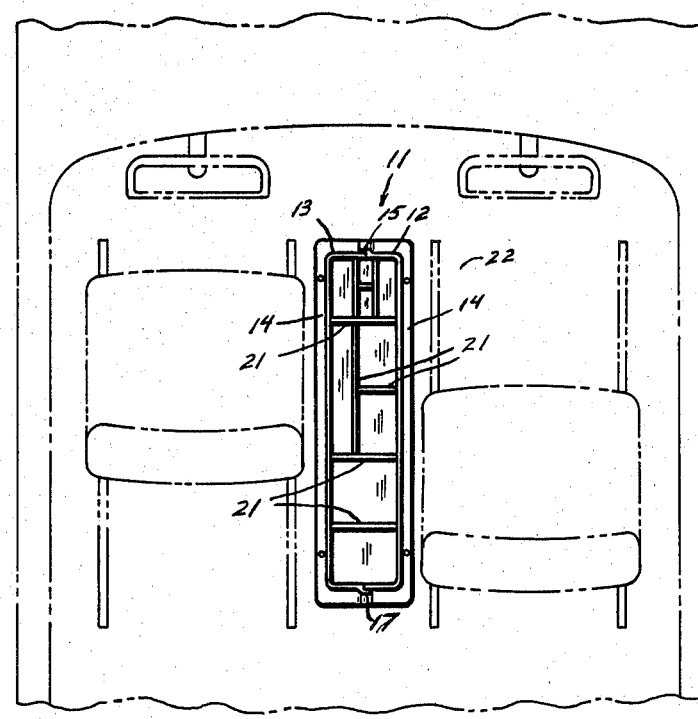
FIG. 6 is a top view thereof showing the aircraft console assembly in its operative use position within an aircraft cabin.
Figure 7:
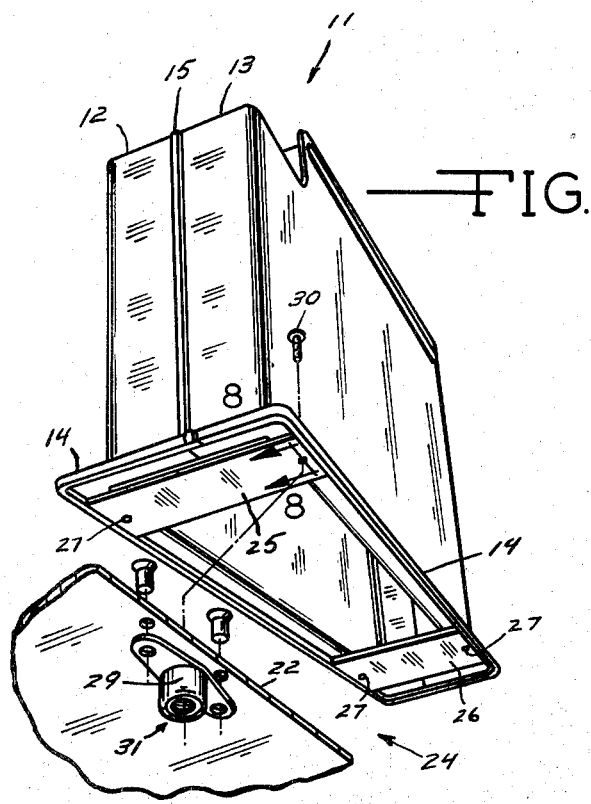
FIG. 7 is a bottom perspective view thereof showing the floor anchoring assembly in association therewith.

After the aircraft console has been assembled, it is easily installed in its operative use position on the floor 22 of an aircraft cabin 23 as shown in FIG. 6. The aircraft console 11 is firmly anchored in place by the anchor assembly 24 shown in FIGS. 7 and 8. The anchor assembly 24 comprises a pair of spaced-apart transversely oriented anchor connector panels 25 and 26 which respectively extend transversely across the bottom of the aircraft console 11 so that the ends thereof matingly engage the inner portion of the support flange 14 as shown in FIG. 7. Anchor bolt receiving holes 27 are provided through each end of the anchor connector panels 25 and 26 which are in register with corresponding anchor bolt receiving holes 28 provided through the support flange 14.

Figure 8:
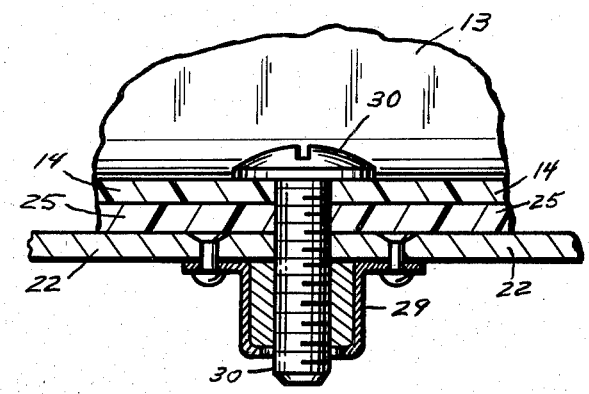
FIG. 8 is a partial schematic cross-sectional view taken on line 8—8 of FIG. 7 showing the floor anchoring assembly.

As shown in FIGS. 7 and 8, an aircraft anchor lug 29 is fixedly mounted under the aircraft floor 22 below and in register with the corresponding holes 27 and 28 provided through the connector panels 25 and 26 and the support flange 14. An anchor bolt 30 is then provided through the holes 27 and 28 into threaded anchoring engagement with the threaded hole 31 provided in the anchor lug 29.

Thus, in summary, an aircraft console is provided which comprises a pair of opposed vertically oriented shell housing members. The pair of opposed shell housing members are adapted to matingly engage at the vertical edges thereof so as to form an aircraft console housing. Each of the opposed vertically oriented shell housing members is provided with a horizontal outwardly extending floor-engaging flange along the bottom portion thereof. The flanges cooperate to form a continuous outwardly extending floor engaging stabilizing support flange along the bottom perimeter of the aircraft console housing. At least a pair of spaced-apart transversely oriented anchor connector panels are selectively positioned transversely across the bottom of the aircraft console housing so that the ends of the anchor panels are in covered mating engagement with portions of the stabilizing support flange proximate thereto. Each end of the anchor panels are provided with anchor bolt receiving holes therethrough in register with corresponding anchor bolt receiving holes provided through the stabilizing support flange. Compartment floor panel support strips are provided for selective horizontal fixed engagement with the inner surfaces of the shell housing members. A plurality of panels are provided for selective fixed engagement with the inner surface of the aircraft console housing and the compartment floor support strips. Such panels include compartment divider or partition panels and compartment floor panels which cooperate with the shell housing members to form selected compartments in the aircraft console housing. Anchor bolts are selectively provided through the anchor bolt receiving holes. The anchor bolts adapted to make threaded locking engagement with anchor lugs fixedly mounted beneath the aircraft cabin floor in register with the anchor bolt receiving holes so as to fixedly retain the aircraft console housing on the aircraft cabin floor.

It is thus seen that a highly utilitarian aircraft console assembly is provided which is easily fabricated and provides versatility, safety and stability in use.

Various other modifications of the invention may be made without departing from the principle thereof. Each of the modifications is to be considered as included in the hereinafter appended claims, unless these claims by their language expressly provide otherwise.

I claim:

1. In an aircraft console comprising:
   a pair of opposed vertically oriented shell housing members, said pair of opposed shell housing members adapted to matingly engage at the vertical edges thereof so as to form an aircraft console housing;
   each of said opposed vertically oriented shell housing member provided with a horizontal outwardly extending floor-engaging flange along the bottom portion thereof, said flanges cooperating to form a continuously outwardly extending floor-engaging stabilizing support flange along the bottom perimeter of said aircraft console housing; and
   a plurality of panels provided for selective fixed engagement with the inner surfaces of said aircraft console housing, said panels including compartment divider panels and compartment floor panels which cooperate with said shell housing members to form selected compartments in said aircraft console housing when said shell housing members are engaged to form said aircraft console housing.

2. In the aircraft console of claim 1 wherein at least a pair of spaced-apart transversely oriented anchor connector panels are selectively positioned transversely across the bottom of said aircraft console housing so that the ends of said anchor panels are in covered mating engagement with portions of said stabilizing support flange proximate thereto, each end of said anchor panels provided with anchor bolt receiving holes therethrough in register with corresponding anchor bolt receiving holes provided through said stabilizing support flange.

3. In the aircraft console of claim 1 wherein compartment floor panel support strips are provided for selective horizontal fixed engagement with the inner surfaces of said shell housing members.

4. In the aircraft console of claim 3 wherein said plurality of panels are provided for selective fixed engagement with the inner surface of said aircraft console housing and said compartment floor support strips.

5. In the aircraft console of claim 2 wherein anchor bolts are selectively provided through said anchor bolt receiving holes, said anchor bolts adapted to make threaded locking engagement with anchor lugs fixedly mounted beneath the aircraft cabin floor in register with said anchor bolt receiving holes so as to fixedly retain said aircraft console housing on the aircraft cabin floor.

* * * * *